April 18, 1939.   H. F. MERRIAM   2,155,200
PRODUCTION OF SULPHUR DIOXIDE
Filed Jan. 19, 1934
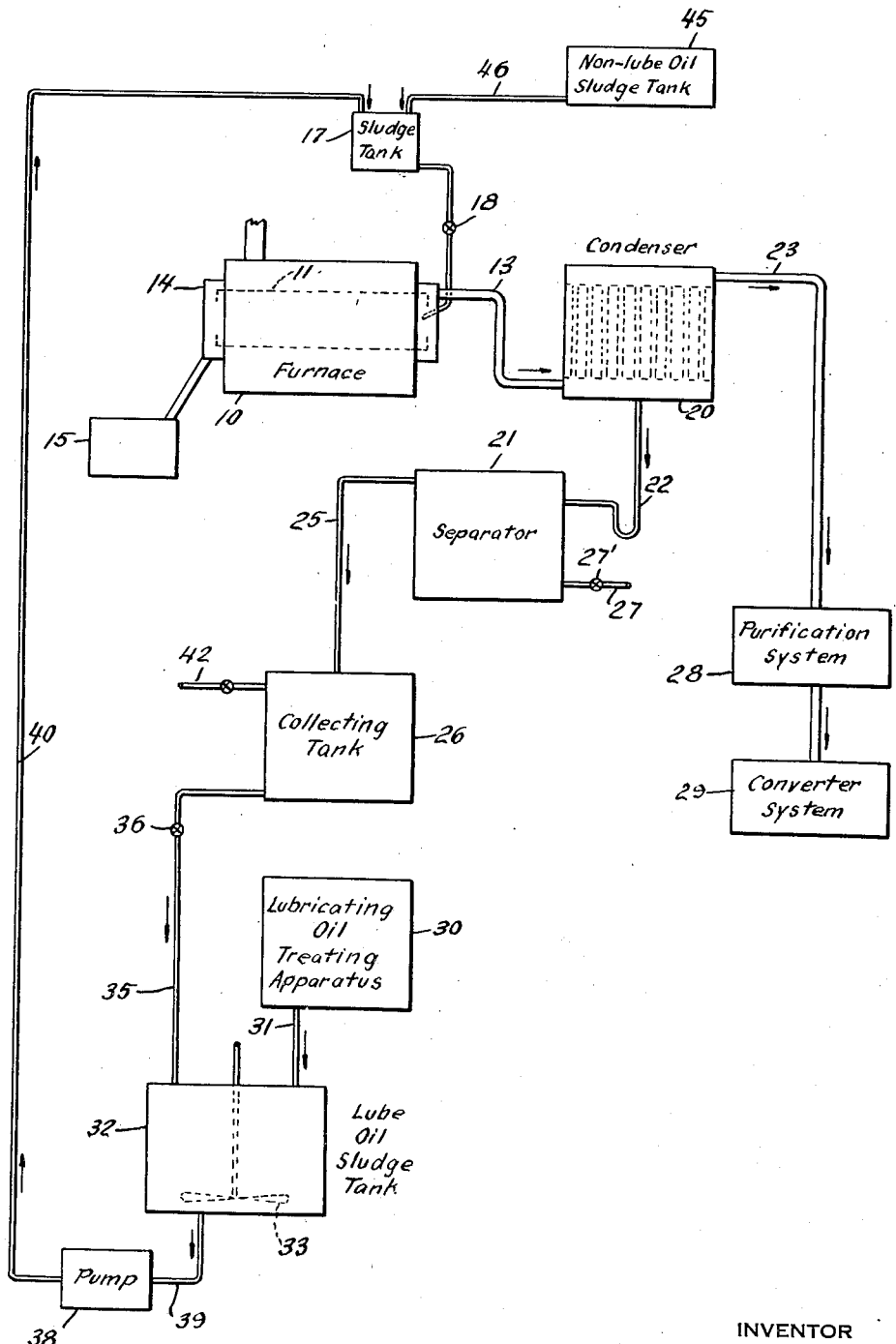
INVENTOR
H. F. Merriam
BY
ATTORNEY Patented Apr. 18, 1939

2,155,200

UNITED STATES PATENT OFFICE 2,155,200

PRODUCTION OF SULPHUR DIOXIDE

Henry F. Merriam, West Orange, N. J., assignor to General Chemical Company, New York, N. Y., a corporation of New York Application January 19, 1934, Serial No. 707,295

7 Claims. (Cl. 23—177)

This invention relates generally to the utilization of residues from the acid treatment of petroleum products for the manufacture of sulphuric acid or other valuable products. More particularly, the invention is directed to methods for producing sulphur dioxide gas mixtures suitable for conversion to sulphur trioxide by the contact process, and employing as sources of sulphur dioxide acid sludges constituting waste products of oil refining processes in which sulphuric acid is employed.

It has been proposed to decompose acid sludge to produce gas mixtures containing sulphur dioxide, and to convert the sulphur dioxide to sulphur trioxide by the contact process. As a rule, prior methods involve decomposition of the sludge by heating with production principally of sulphur dioxide, water and hydrocarbon vapors, cooling the gas stream to condense water and hydrocarbon vapors, adding air to form a gas mixture containing convertible proportions of sulphur dioxide and oxygen, and then catalytically oxidizing the sulphur dioxide to sulphur trioxide. In order to provide economically practicable methods of this general nature, the acid sludges used should be free flowing and in a condition in which the sludges may be readily pumped.

Large quantities of acid sludges produced in the refining of certain types of oils, for example heavy lubricating oils, with sulphuric acid are heavy, thick and viscous and are sometimes impossible to handle by ordinary methods such as pumping. Suggestions have been made to blend such sludges with oils, obtained in other refining processes, for the purpose of transforming the heavy acid sludges to a more fluid condition. Only certain oils will blend with heavy sludges. Thus, many mixtures or solutions obtained by mixing heavy sludges with lighter oils are often not permanent. Hence, handling of heavy sludges presents difficult problems in oil refining methods, and also in processes for recovering valuable constituents from the acid sludges. Furthermore, proposals for treating heavy acid sludges to increase fluidity have involved the use of oils produced in processes other than those directed to the decomposition of the acid sludges.

The present invention especially relates to methods for producing sulphur dioxide gas mixtures, suitable for use in the manufacture of sulphur trioxide by the contact process, from heavy, viscous acid sludges. The principal object of the invention is to provide methods by which heavy, normally non-free flowing sludges may be rendered more fluid, and transformed to a condition in which they may be readily handled, for example by pumping. Another important object is directed to the provision of methods for increasing the fluidity of heavy acid sludges by means of an oil formed during decomposition of acid sludges.

When decomposing acid sludges by heating, primarily for the production of sulphur dioxide, there is generally formed, on cooling of the decomposing retort exit gas mixture, a condensate containing substantial quantities of hydrocarbon oils. It has been found that when sludge material, resulting from sulphuric acid treatment of hydrocarbon oils obtained preferably from sulphur containing crudes, is decomposed by heating to form a gas mixture containing hydrocarbon vapors and the gas mixture is cooled, for example to about normal temperatures, a sulphur bearing oily condensate is obtained which is a superior solvent for heavy, normally non-fluid acid sludges such as those formed during treatment with sulphuric acid of hydrocarbon distillates used in the manufacture of lubricating oils. It has further been found that by incorporating relatively small amounts of these condensate oils with heavy sludges, such as lubricating oil acid sludges, the heavy sludge material is converted to a free-flowing condition in which the sludge may be readily pumped and handled in processes for decomposing acid sludges by heating.

In carrying out one preferred embodiment of the invention, a quantity of sulphur bearing oily condensate, recovered by cooling an acid sludge decomposing retort exit gas mixture, is incorporated in a body of heavy, normally non-free flowing acid sludge. Enough oily condensate is used to convert the heavy sludge to a free-flowing mass. The latter is then introduced into a decomposing retort, and decomposed by heating, preferably in the substantial absence of air, to form a retort exit gas mixture comprising principally water vapor, sulphur dioxide, condensable hydrocarbon and sulphur compounds, and smaller amounts of uncondensable hydrocarbons and gases such as carbon dioxide, carbon monoxide, and nitrogen. This gas mixture is cooled to about normal temperatures to condense and separate from the gas stream the major portions of water and condensable hydrocarbons and sulphur compounds. The oil and water comprising this initial condensate are separated, and the oil recovered is mixed with further quantities of heavy acid sludges to render the same flowable, and put these sludges in a condition such that they may be readily pumped into the decomposing retort. The residual gas, remaining after cooling of the initial retort exit gas stream, has a high sulphur dioxide concentration, and may be further purified if desired, diluted with air and utilized in the manufacture of sulphuric acid by the contact process.

A further appreciation of the objects and advantages of the invention may be had from a consideration of the following description taken in connection with the accompanying drawing illustrating diagrammatically apparatus in which a preferred embodiment of the process of the invention may be carried out.

Referring to the drawing, 10 indicates the combustion chamber of a furnace adapted to burn coal, coke, oil, natural gas or other fuel. Mounted in chamber 10 is a decomposing kiln or retort 11 of any desirable construction, for example a fixed shell provided with suitable mechanism such as a screw conveyor, not shown, to facilitate discharge of coke. A rotary retort may also be employed if desired. Preferably, an externally heated kiln adapted to substantially exclude admission of air is used. One end of kiln 11 communicates with a gas outlet 13, and the opposite end projects into a header 14 into which the solid residue of the decomposition of the acid sludge is continuously discharged. Header 14 empties into air-lock 15 through which coke may be discharged without admitting air to the kiln. Acid sludges are run into the kiln from supply tank 17 through a valve-controlled pipe 18.

Gas outlet 13 is connected to the lower end of a cooler or condenser 20 of any suitable construction, either air or water cooled, and operated so as to reduce the temperature of the gas stream to substantially normal to condense major portions of the water vapor and of the condensable hydrocarbons contained in the gas. Condensate from the cooler drains into a collecting tank or separator 21 through a pipe 22 having a liquid seal.

Separator 21 may be a tank or vat large enough to permit continuous gravity separation of water and oil contained in the condensate discharge from condenser 20. The hydrocarbon oils and sulphur compounds of the condensate rise to the top of the mass in the separator, and may be withdrawn continuously or intermittently through pipe 25 discharging into a collecting tank 26. Water settling to the bottom of the separator may be drawn off through pipe 27, controlled by valve 27', and discharged to waste or otherwise disposed of.

The gases uncondensed in cooler 20, containing principally sulphur dioxide, are discharged through gas line 23 into a purification system 28, and thence to a converter system 29 for oxidation to sulphur trioxide for use in the manufacture of sulphuric acid.

Reference numeral 30 indicates apparatus in which hydrocarbon distillates used in the production of heavier oils, such as lubricating oils, are treated with sulphuric acid. In this apparatus, the heavy, viscous, normally non-free flowing lubricating oil acid sludge is formed. The acid sludge produced is discharged through line 31 into a receptacle or tank 32 which may conveniently be provided with a suitable agitator 33. Oil from collecting tank 26 is run into sludge tank 32 through a pipe line 35, having a control valve 36. The inlet side of a pump 38 is connected through pipe 39 with sludge tank 32, and the fluid mass formed in tank 32 is pumped through line 40 into the decomposing retort acid sludge supply tank 17.

A preferred embodiment of the process of the invention may be carried out in the apparatus described substantially as follows:

The acid sludges employed in the present process for the production of sulphur dioxide are the heavier, usually viscous sludges such as those resulting from the treatment with sulphuric acid of hydrocarbon distillates utilized in the manufacture of lubricating oils. These distillates are preferably obtained from crude mineral oils containing preferably not less than about 0.5% sulphur, such sulphur being in a form which is not evolved as hydrogen sulphide during processing of the mineral oils prior to or during the sulphuric acid treatment which results in the production of the acid sludges. Crude oils of this nature are found, for example, in California or Texas. These heavy sludges, referred to in the art as lube oil sludges, are usually extremely viscous under most favorable conditions, and are often such as to become almost solid shortly after discharge from the apparatus in which the lubricating distillates are treated with the sulphuric acid.

The composition of lube oil acid sludges varies widely. One representative lube oil sludge had a titratable acidity of 32.6% expressed as $H_2SO_4$, and yielded on decomposition by destructive distillation 53.6% residual coke, and a retort gas which on cooling produced 3.0% oils and 22.5% water, the balance of the gas mixture comprising sulphur dioxide, carbon monoxide, carbon dioxide, nitrogen, water vapor, and uncondensable hydrocarbons.

Purification with sulphuric acid of hydrocarbon distillates used in the manufacture of lubricating oils is well known in the art, and such treatment may be carried out for example in apparatus indicated diagrammatically at 30 on the drawing. The sludge formed may be run into sludge tank 32. When starting up the present process, the initial quantities of lube oil acid sludges charged into tank 32 may be diluted with oil from tank 26 produced in a previous operation; or other suitable light hydrocarbon oil may be employed. One such satisfactory oil is the sulphur bearing oily condensate recovered for example, from a cooler as a condenser 20 when decomposing non-lube oil acid sludge, i. e., acid sludges resulting from the treatment with sulphuric acid of light distillates, such as gasoline and kerosene obtained from sulphur bearing crudes. These oily condensates after separation of water, contain sulphur from about 5 to about 22%. It has been found that as a rule about one part of an oil of this nature is sufficient to convert three to four parts of a heavy, normally non-free flowing lube oil sludge to a condition sufficiently fluid to be handled readily by ordinary methods. Hence, a suitable quantity of sulphur bearing oil is run into tank 32 along with the heavy sludge acid from treating apparatus 30. Agitator 33 is driven at a suitable rate to mix the mass which is withdrawn from tank 32 and forced by pump 38 through line 40 into retort supply tank 17.

Sludge material is continuously fed into kiln 11 from supply tank 17. The burners in furnace 10 are adjusted to preferably maintain within the kiln temperatures of about 250° F. at the sludge inlet end, and about 500° F. at the coke outlet end. Temperatures in the hottest part of the retort should desirable not exceed about 750°

F., as above this temperature the sulphur bearing oils of the present invention are decomposed.

The sludge is decomposed in the kiln by the action of heat, and the free and combined sulphuric acid of the sludge is reduced to sulphur dioxide by the hydrogen of the hydrocarbons and/or by the carbonaceous matter contained in the sludge. Water vapor is produced and hydrocarbon vapors and sulphur compounds are formed. Residual coke is continuously discharged from the kiln through air-lock 15.

The gas resulting from the decomposition of the sludge contains principally water vapor and sulphur dioxide, substantial amounts of condensable hydrocarbons, sulphur compounds and small quantities of gases such as carbon dioxide, carbon monoxide, hydrocarbons and nitrogen. For example, the exit gas mixture of the retort may contain about 50% water vapor, about 5% hydrocarbon vapors, the balance comprising sulphur dioxide, carbon dioxide, carbon monoxide, nitrogen, hydrocarbon gases and oxygen. As previously noted, according to a preferred embodiment of the process, decomposition of sludges is effected in the kiln substantially in the absence of oxygen. When so operating, formation of carbon dioxide is lessened, presumably because dilution of the sulphur dioxide gas and burning of hydrocarbons and carbonaceous matter of the sludge are prevented by conducting the operation out of contact with air.

The hot gaseous and vaporous products of decomposition of the sludge are discharged from the kiln and passed through conduit 13 into condenser 20 in which the gases are cooled to substantially normal temperatures, e. g., 70–100° F. Cooling may be accomplished by circulating any suitable cooling liquid or gas through the condenser in indirect heat exchange relation with the retort gas mixture. In place of the condenser illustrated in the drawing a vertical tower having a spray head at the top for introduction of water may be employed. In such cases, the retort gas mixture is introduced into the bottom of the tower and flows upwardly, intimately contacting and mingling with the downwardly directed spray of water fed in at the top of the tower. The amount of cooling water introduced is so controlled as to cool the exit gases leaving the top of the tower at about normal temperatures.

During cooling of the retort gas mixture in the condenser 20, major portions of the water vapor and of the hydrocarbon vapors and sulphur compounds are condensed out of the gas stream. The condensate of cooler 20, containing varying proportions of water and liquid hydrocarbons, is drained through pipe 22 into separator 21. In the latter, the condensate oils rise to the top of the liquid mass in the tank, and may be intermittently or continuously withdrawn through pipe 25 into tank 26 for collecting what may be considered a raw sulphur oil condensate. The water settling to the bottom of the separator 21 may be discharged from the system through pipe 27.

The oil collecting in tank 26 is an oil containing generally from about 2 to about 22% sulphur, apparently in strong chemical combination. It will be understood the sulphur content of this condensate may vary considerably in accordance with the characteristics of the initial crude oils and of the acid sludges produced on treatment of the crude hydrocarbon oil distillates with sulphuric acid. For example, a composite of several lube oil acid sludges formed by sulphuric acid treatment of lubricating oil distillate obtained from California crudes, yielded an oil condensate amounting to 3% by volume of the sludge, the condensate analyzing 3.3% sulphur.

In this operation it will be observed the oil initially used to render the sludge in tank 32 fluid is again recovered as condensate in tank 26. Although the amount of condensate recovered from a given body of heavy acid sludge would as a rule be insufficient to provide solvent enough for a subsequent equal volume of the same acid sludge to convert the sludge to flowable consistency, generally the amount of sulphur-bearing oil recovered from a given body of lube oil acid sludge is more than enough to make up for small quantities of oil which may be lost during a cycle of the process, for example as by incomplete condensation in cooler 20. As the process proceeds, quantities of sulphur bearing oil condensates are continuously produced, and the amount of condensate in the system gradually increases. The excess amount of condensate formed may be withdrawn from the system either continuously or intermittently from collecting tank 26 through a valved tap 42.

In usual refining plant practice, there are also available substantial quantities of acid sludge resulting from the treatment with sulphuric acid of non-lube oil distillates such as gasolene and kerosene. These sludges are usually fluid and flow readily, and on decomposition by heating result in the production of sulphur bearing oily condensates of higher sulphur content and of larger volume, with respect to the initial body of sludge, than the condensates produced when decomposing lube oil sludges. For example, a non-lube oil acid sludge formed by sulphuric acid treatment of a straight run gasolene produced from a West Texas crude yielded an oil condensate of 12% by volume of the sludge and analyzing 14.8% sulphur. The present process may be carried out in conjunction with the decomposition of non-lube oil acid sludges. In this connection, non-lube oil acid sludge may be run from a tank such as 45 through line 46 into sludge tank 17, and decomposed in retort 11, along with lube oil acid sludge. When so operating, since decomposition of non-lube oil sludge usually results in the production of larger quantities of oily condensate in condenser 20, the amount of sulphur bearing oils formed in the process as a whole and recovered in collecting tank 26 is substantially increased. The excess produced, over that needed to provide solvent for the heavy sludge in tank 32, may be withdrawn from tank 26 through tap 42.

The gases uncondensed in cooler 20 are discharged through line 23. Owing to the separation of water and hydrocarbons from the gas stream, the sulphur dioxide concentration of the latter is largely increased, and the exit gas of the condenser may contain upwards of 75% sulphur dioxide and smaller quantities of carbon dioxide, carbon monoxide, and uncondensed hydrocarbon gases and water vapor. This concentrated sulphur dioxide gas may be passed into purification system 28 and treated as desired to remove impurities, and after dilution with air to provide convertible proportions of sulphur dioxide and oxygen, may be run to the converter system and oxidized to sulphur trioxide by the contact process. The strong sulphur dioxide exit gas of condenser 20 may be used for other purposes if desired.

I claim:

1. The method for producing sulphur dioxide from normally non-free flowing sludge material derived from sulphuric acid treatment of mineral oils comprising decomposing the sludge by heating to temperatures not in excess of about 750° F. to effect formation of a gas mixture containing sulphur dioxide and condensable sulphur bearing oil vapor, cooling the gas mixture to recover sulphur bearing oil, recovering sulphur dioxide, incorporating in a further quantity of normally non-free flowing sludge material derived from sulphuric acid treatment of mineral oils an amount of said recovered oil sufficient to render the sludge material free-flowing, and then decomposing the sludge material by heating to form further quantity of sulphur dioxide.

2. The method for producing sulphur dioxide from normally non-free flowing sludge material derived from sulphuric acid treatment of mineral oils comprising decomposing the sludge by heating to temperatures not in excess of about 750° F. to effect formation of a gas mixture containing sulphur dioxide and water and condensable sulphur bearing oil vapors, cooling the gas mixture to condense water and sulphur bearing oil vapors, separating water and oil, recovering sulphur dioxide, incorporating with a further quantity of normally non-free flowing sludge material derived from sulphuric acid treatment of mineral oils an amount of said recovered oil sufficient to render the sludge material free-flowing, and then decomposing the sludge material by heating to form further quantity of sulphur dioxide.

3. The method for producing sulphur dioxide from normally non-free flowing sludge material derived from sulphuric acid treatment of mineral oils comprising incorporating in the sludge material sulphur bearing oil in quantity sufficient to form a free-flowing mass, said oil being obtained as condensate by dissociating with aid of heating at temperatures not in excess of about 750° F. sludge material derived from sulphuric acid treatment of mineral oils, introducing the sludge mass into a reaction zone, dissociating the sludge with aid of heating to temperatures not in excess of about 750° F. to effect formation of a gas mixture containing sulphur dioxide and condensable sulphur bearing oil vapors, cooling the gas mixture to recover sulphur bearing oil, recovering sulphur dioxide, incorporating with a further quantity of normally non-free flowing sludge material an amount of said recovered oil sufficient to render the sludge material free-flowing, and then dissociating the sludge material with aid of heat to form a further quantity of sulphur dioxide.

4. The method for producing sulphur dioxide from normally non-free flowing sludge material derived from sulphuric acid treatment of mineral oils comprising incorporating in the sludge material sulphur bearing oil in quantity sufficient to form a free-flowing mass, said oil being obtained as condensate by dissociating with aid of heating at temperatures not in excess of about 750° F. sludge material derived from sulphuric acid treatment of mineral oils, introducing the sludge mass into a reaction zone, dissociating the sludge with aid of heating to temperatures not in excess of about 750° F. to effect formation of a gas mixture containing sulphur dioxide and water and condensable sulphur bearing oil vapors, cooling the gas mixture to condense water and sulphur bearing oil vapors, separating water and oil, recovering sulphur dioxide, incorporating with a further quantity of normally non-free flowing sludge material derived from sulphuric acid treatment of mineral oils an amount of said recovered oil sufficient to render the sludge material free-flowing, and then dissociating the sludge material with aid of heat to form a further quantity of sulphur dioxide.

5. The method for producing sulphur dioxide from normally non-free flowing sludge material derived from sulphuric acid treatment of mineral oils comprising incorporating in the sludge sulphur bearing oil containing not less than about 2% sulphur and in quantity sufficient to render the sludge free-flowing, said oil being obtained as condensate by dissociating with aid of heating at temperatures not in excess of about 750° F., sludge material derived from sulphuric acid treatment of mineral oils, introducing the sludge mass into a reaction zone, dissociating the sludge with aid of heating to temperatures not in excess of about 750° F. to effect formation of a gas mixture containing sulphur dioxide and water and condensable sulphur bearing oil vapors, cooling the gas mixture to about normal temperature to condense water and sulphur bearing oil vapors, recovering sulphur dioxide, separating water and oil, incorporating with a further quantity of normally non-free flowing sludge material derived from sulphuric acid treatment of mineral oils an amount of said recovered oil sufficient to render the sludge material free-flowing, and then dissociating the sludge with aid of heat to form a further quantity of sulphur dioxide.

6. In the art of handling normally non-free flowing sludge material derived from sulphuric acid treatment of mineral oils, the improvement comprising mixing the material with sulphur bearing oil in quantity to convert the non-free flowing material to a readily flowable mass which may be pumped, said oil being formed by dissociating sludge material derived from sulphuric acid treatment of mineral oils with aid of heating at temperatures not in excess of about 750° F. to effect formation of a gas mixture containing condensable sulphur bearing oil vapor and then condensing the vapor to recover the sulphur bearing oil.

7. In the art of handling normally non-free flowing sludge material derived from sulphuric acid treatment of mineral oils, the improvement comprising mixing the material with sulphur bearing oil in quantity to convert the non-free flowing material to a readily flowable mass which may be pumped, said oil containing not less than about 2% sulphur and being formed by dissociating sludge material derived from sulphuric acid treatment of mineral oils with aid of heating at temperatures not in excess of about 750° F. to effect formation of a gas mixture containing condensable sulphur bearing oil vapor and then condensing the vapor to recover the sulphur bearing oil.

HENRY F. MERRIAM.